United States Patent [19]

Hoff et al.

[11] 4,233,253
[45] Nov. 11, 1980

[54] METHOD FOR THE PREPARATION OF METAL SALTS OF PHOSPHORUS ACID ESTERS

[75] Inventors: Glen R. Hoff, Naperville, Ill.; Peter Fotis, Highland, Ind.

[73] Assignee: Standard Oil Company (Indiana), Chicago, Ill.

[21] Appl. No.: 972,822

[22] Filed: Dec. 26, 1978

[51] Int. Cl.$^3$ ............................................... C07F 9/09
[52] U.S. Cl. ................................. 260/987; 260/439 R
[58] Field of Search ........................... 260/987, 439 R

[56] References Cited

U.S. PATENT DOCUMENTS

| | | | |
|---|---|---|---|
| 2,409,774 | 10/1946 | Mack et al. | 260/987 |
| 2,790,765 | 4/1957 | Otto et al. | 260/987 |
| 3,030,334 | 4/1962 | Canarios et al. | 260/987 |
| 3,401,184 | 9/1968 | Revukas | 260/429.3 |
| 3,422,126 | 1/1969 | Bauer | 260/429.5 |
| 3,427,257 | 2/1969 | Bayer et al. | 252/431 |
| 3,474,080 | 10/1969 | Rekers | 260/88.2 |
| 3,655,704 | 4/1972 | Sherman et al. | 260/987 |
| 3,669,945 | 6/1972 | Nakaguchi et al. | 260/85.3 R |
| 3,910,976 | 10/1975 | Fein | 260/429 R |
| 3,929,745 | 12/1975 | Huerta et al. | 260/80.78 |
| 4,083,860 | 4/1978 | Ruf | 260/429.7 |
| 4,111,839 | 9/1978 | Meyer | 260/439 R |
| 4,117,022 | 9/1978 | Meyer | 260/669 P |

OTHER PUBLICATIONS

Paul et al., "Chem. Abs.," vol. 77, (1972), p. 334.
Mikulski et al., "Chem. Abs.," vol. 80, (1974) p. 518.
Paul et al., "Chem. Abs.," vol. 82, (1975), p. 597.
Mikulski et al., "Chem. Abs.," vol. 75, (1971) pp. 485–486.

*Primary Examiner*—Anton H. Sutto
*Attorney, Agent, or Firm*—Stephen L. Hensley; William T. McClain; W. H. Magidson

[57] ABSTRACT

Method for preparing metal salts of phosphorus acid esters comprising reacting metal salts of organic acids with phosphorus acid esters. By-product removal is facilitated such that high purity products are produced. Products are particularly useful as support materials in the preparation of highly active alpha-olefin polymerization catalyst components.

8 Claims, No Drawings

METHOD FOR THE PREPARATION OF METAL SALTS OF PHOSPHORUS ACID ESTERS

BACKGROUND OF THE INVENTION

This invention relates to metal salts of phosphorus acid esters and more particularly, to a simplified method for the preparation of such compounds wherein separation of reaction by-products is facilitated.

Metal salts of phosphorus acid esters are known compounds which find use in a number of applications such as additives for hydrocarbon fuels, unsupported catalyst components for the polymerization of alpha-olefins, and materials useful in the preparation of unsupported alpha-olefin polymerization catalysts. Additionally, as disclosed in our copending application Ser. No. 973,108 filed in the name of Glen R. Hoff and Peter Fotis on the instant filing date, we have found that divalent metal salts of phosphorus acid esters give highly beneficial results when used as support materials in the preparation of highly active supported catalyst components for the polymerization of alpha-olefins.

A number of methods for the preparation of metal salts of phosphorus acid esters are known. One such method involves reaction of phosphorus acid esters and metal halides. Thus, for example, cobalt and nickel bis(diethyl orthophosphates) have been prepared by reaction of triethyl orthophosphate with the divalent metal chlorides as reported in Paul, R. C., et al., *Chem. Abs.*, Vol. 77 p. 334 (1972). Similarly, dialkyl orthophosphate salts of various Group IA, IB, IIIA, IIIB, IVB, VB, VIB, VIIB, and VIII metals have been prepared by reaction of metal halides with trialkyl orthophosphates as reported in Mikulski, C. M., et al., *Chem. Abs.*, Vol. 80, p. 518 (1974). Reaction of anhydrous vanadium trichloride, chromium trichloride, manganese dichloride and copper dichloride with triethyl phosphate to form bis- and tris(diethyl phosphate) salts also has been reported; see Paul, R. C., et al., *Chem. Abs.*, Vol. 82, p. 597 (1975). U.S. Pat. No. 3,910,976, to Fein, discloses reaction of magnesium chloride hexahydrate with tris-2-chloroethyl phosphate to form magnesium bis(di-2-chloroethyl phosphate). Mikulski, C. M., et al., *Chem. Abs.*, Vol. 75, pp. 485-6 (1971), discloses reaction of trivalent vanadium, chromium, and iron halides with triethyl thionophosphate to form tris(diethyl thionophosphate) salts of the metals.

A related method, disclosed in U.S. Pat. No. 3,401,184, to Revukas, involves reaction of phosphorus pentoxide with halides of polyvalent Group II, IV, VI, or VIII metals and hydroxyl group-containing organic compounds in an organic solvent.

While the above-described preparative methods give the desired products, the use of metal halides as starting materials often is disadvantageous because such materials typically are difficult to dry and maintain in anhydrous condition. As a result, water often is present in the final products. Further, the use of metal halides as starting materials leads to formation of hydrogen halides and/or organic halides as reaction by-products. The presence of such by-products and/or water in the final products renders the same unsuitable for a number of applications. For example, the presence of water in the phosphorus acid ester salts used as support materials in the preparation of highly active alphaolefin polymerization catalyst components according to our copending patent application results in inferior catalyst components because water poisons the activity of the components. Similarly, the presence of even traces of hydrogen halides in certain phosphorus acid ester salts used as lubricant additives is harmful. Although water and reaction by-products can be removed from phosphorus acid ester salts prepared according to the above-described methods by suitable drying and washing techniques, such operations add cost and complexity to the preparation.

To avoid the above-described difficulties, it has been proposed to prepare metal salts of phosphorus acid esters without the use of metal halides as starting materials. For example, U.S. Pat. No. 3,422,126, to Bauer discloses that halogen-free titanium tetrakis(mixed mono- and dialkyl orthophosphates) can be prepared by reacting tetraalkyl titanates with mixed mono- and dialkyl orthophosphates. Aliphatic alcohols are the primary reaction by-products and are removed by carrying out the preparation at temperatures high enough to distill the alcohol. Similarly, U.S. Pat. No. 3,929,745, to Huerta et al., discloses reaction of vanadium pentoxide or alkyl vanadates with organic phosphates, optionally in the presence of oxygen, to form vanadium oxybis(organo phosphates). Primary reaction by-products include alcohols, ethers, aldehydes, and water. U.S. Pat. No. 3,474,080, to Rekers discloses preparation of chromyl bis(diorgano phosphates) by reacting chromium oxide with triorgano phosphates. U.S. Pat. No. 3,669,945, to Nakaguchi et al. discloses reaction, either in the presence of water and/or alcohol or neat, of vanadium compounds such as oxides, sulfate, oxysulfate, sodium and ammonium salts of vanadic acid and esters thereof with alcohols, as well as halides and oxyhalides, with phosphoric acids, their anhydrides, salts, and esters. Similarly, U.S. Pat. No. 3,427,257, to Bayer et al., discloses reaction of vanadium oxides with organophosphorus compounds of the formula $O=PR_1R_2R_3$ wherein $R_1$, $R_2$, and $R_3$ are hydrogen, hydroxyl, alkyl, alkoxy, or aryl, at least one of $R_1$, $R_2$ and $R_3$ being an organic group.

Another preparative method which avoids the use of metal halide starting materials is disclosed in U.S. Pat. No. 3,910,976, to Fein, wherein tetravalent vanadyl salts, such as vanadyl sulfate, oxalate, or acetate, are reacted with Group IIA or IIB metal organo phosphate or organo phosphite salts to form vanadium oxybis(organo phosphates) or oxybis(organo phosphites) by metathesis of the metals contained in the starting materials.

While the above-described methods avoid the formation of halogen-containing reaction by-products, other difficulties are encountered. For example, the alcohols and/or ethers formed as by-products according to the Bauer and Huerta et al. patents tend to complex with the final products such that substantial removal of such by-products often is difficult. Similar to water, alcohols and ethers can adversely affect the performance of alpha-olefin polymerization catalysts. The metathesis preparation disclosed by Fein it disadvantageous because the starting materials employed include compounds of the type to be prepared and because incompletely reacted starting materials are difficult to remove from the final product.

From the foregoing, the desirability of producing metal salts of phosphorus acid esters by a method which avoids the use of metal halides as starting materials and permits substantial removal of by-products by convenient means can be appreciated. It is an object of this invention to provide such a method. A further object of the invention is to provide for the preparation of metal salts of phosphorus acid esters useful in the preparation of alpha-olefin polymerization catalyst components. Other objects of the invention will be apparent to persons of skill in the art from the following description and appended claims.

We have found that the objects of this invention can be attained by reaction of metal salts of organic acids with phosphorus acid esters. The metal salts employed as starting materials are easy to dry and maintain in the anhydrous state such that impurities are substantially excluded from the preparative system and the final products. Moreover, the primary by-products produced according to the invented method are organic acid esters which are conveniently removed by techniques such as distillation, filtration, decantation, and through the use of reduced pressures. While the by-products are capable of complexing with certain of the final products, the complexes are sufficiently weak that substantial removal can be achieved by such techniques. According to a particularly advantageous embodiment of the invention, the metal salts and phosphorus acid esters employed as starting materials are selected such that low boiling organic acid ester by-products are formed. Such by-products can be removed during preparation through the use of suitable reaction temperatures, and production rates are thereby increased.

DESCRIPTION OF THE INVENTION

Briefly, the method of this invention comprises reacting at least one metal salt of an organic acid with at least one phosphorus acid ester in amounts such that a phosphorus acid ester salt having at least one phosphorus acid ester group bonded to metal through oxygen or sulfur is produced, and at a temperature such that the metal acid salt and the phosphorus acid ester will react without substantial decomposition of the phosphorus acid ester.

Metal salts of orgaic acids useful according to this invention include salts of aliphatic acids of 2 to about 20 carbon atoms, salts of aromatic acids of 7 to about 12 carbon atoms, and salt of aliphatically-substituted aromatic acids or aryl-substituted aliphatic acids of 8 to about 20 carbon atoms wherein the metal is a member of Groups IB, IIA, IIB, IIIA, IIIB, IVA, IVB, VB, VIB, VIIB, or VIII of the Periodic Table. Salts of monocarboxylic acids are preferred although salts of di-, tri- and tetracarboxylic acids also are suitable. The Periodic Table referred to herein is that appearing in *Handbook of Chemistry and Physics*, 50th ed., Chemical Rubber Company (1969). Specific examples of the aforesaid metals include copper, magnesium, calcium, zinc, aluminum, scandium, lanthanum, titanium, zirconium, vanadium, chromium, molybdenum, manganese, iron, and cobalt.

Specific examples of the organic acid groups bonded to the aforesaid metals include aliphatic acid groups of 2 to about 20 carbon atoms such as acetate, oxalate, propionate, malonate, acrylate, butyrate, succinate, crotonate, vinylacetate, maleate, hydrosorbate, octoate, suberate, laurate, palmitate, stearate, oleate, linoleate, arachidate, and arachiodonate; aromatic acid groups of 7 to about 12 carbon atoms such as benzoate, phthalate, trimellitate, naphthoate, and naphthalate; and aliphatically-substituted aromatic acid groups and aryl-substituted aliphatic acid groups of 8 to about 20 carbon atoms such as toluate, xylilate, ethylbenzoate, diethylbenzoate, butylbenzoate, hexylbenzoate, decylbenzoate, tetradecylbenzoate, phenacetate, phenylbutyrate, phenylvalerate, and phenyllaurate. Certain of the unsaturated acid salts, such as the acrylates and methacrylates, tend to polymerize on heating. To avoid polymerization, it is contemplated to employ a conventional polymerization inhibitor in conjunction with such salts and/or to avoid exposure of the salts to polymerizing temperatures.

Specific examples of useful metal salts include magnesium acetate, magnesium oxalate, magnesium butyrate, magnesium vinylacetate, magnesium octoate, magnesium laurate, magnesium oleate, magnesium benzoate, magnesium trimellitate, magnesium toluate, magnesium hexylbenzoate, magnesium phenacetate, calcium acetate, calcium malonate, calcium stearate, zinc acetate, zinc maleate, zinc stearate, zinc trimellitate, zinc phenacetate, titanium oxodiacetate, titanium tetraacrylate, titanium oxodipropionate, zirconium tetraacetate, zirconium tetrabutyrate, zirconium tetracrotonate, zirconium tetrabenzoate, vanadium oxotriacetate, vanadium tetraacetate, vanadium oxotripropionate, vanadium oxotrilaurate, chromium triacetate, chromium tributyrate, manganous acetate, manganous propionate, manganous octoate, manganous succinate, manganous oleate, manganous benzoate, manganous toluate, manganous phenacetate, ferrous acetate, ferrous maleate, ferrous benzoate, and ferrous phenacetate.

As can be appreciated, the particular metal salt to be employed as a starting material will vary depending upon the desired final product. Mixtures of salts of the same or different metals can be employed if desired. The preparation according to this invention involves replacement of organic acid groups with phosphorus acid ester groups and formation of organic acid ester by-products, and accordingly, irrespective of the metal contained in the metal salt, it is preferred to employ materials wherein the organic acid groups bonded to the metal are such as to lead to formation of low boiling organic acid ester by-products to facilitate removal thereof. Preferred metal salts are those wherein the organic acid groups are alkanoic acid groups of 2 to about 6 carbon atoms such as acetate, propionate, butyrate, valerate, and caproate. Most preferably, the metal salts employed according to this invention are metal acetates. Specific examples of useful metal acetates include magnesium acetate, calcium acetate, zinc acetate, aluminum acetate, vanadium tetraacetate, vanadium oxotriacetate, chromium triacetate, manganous acetate and ferrous acetate.

According to the invention, the above-described metal salts preferably are employed in the anhydrous state and to this end, drying of the salts prior to use is desirable, particularly with respect to salts of the Group IB-VIIB metals as these are commonly obtained in the hydrated form. Known drying techniques, such as heating or contacting with a chemical drying agent can be employed. When a chemical drying agent is employed it is preferred to use materials, such as carboxylic acid anhydrides, which give by-products which are easily removed from the anhydrous metal salts. Acetic anhydride is particularly useful in this regard.

Phophorus acid esters useful according to this invention are compounds of the formula $Y=P(YR)_2A$, wherein each Y is independently oxygen or sulfur; A is hydrogen, —YH, —YR, or R; and each R is independently an organic radical or an amino- or halo-substituted organic radical, such organic radicals being selected from the group consisting of alkyl radicals of 1 to about 12 carbon atoms, aryl radicals of 6 to about 10 carbon atoms, and aralkyl and alkaryl radicals of 7 to about 12 carbon atoms. Such compounds include the diorgano phosphites (O=P(OR)$_2$H); diorgano mono- and dithiophosphites (O=P(OR)(SR)H and O=P(SR)$_2$H); diorgano thionophosphites (S=P(OR)$_2$H); diorgano mono- and dithiothionophosphites (S=P(OR)(SR)H and S=P(SR)$_2$H); diorgano orthophosphates (O=P(OR)$_2$(OH)); diorgano mono-, di-, and trithiophosphates (O=P(OR)(SR)(OH), O=P(OR)$_2$(SH), O=P(SR)$_2$(OH), O=P(OR)(SR)(SH), and O=P(SR)$_2$(SH)); diorgano thionophosphates (S=P(OR)$_2$(OH)); diorgano mono-, di-, and trithiothionophosphates (S=P(OR)(SR)(OH), S=P(OR)$_2$(SH), S=P(SR)$_2$(OH), S=P(OR)(SR)(SH), and S=P(SR)$_2$(SH)); triorgano orthophosphates (O=P(OR)$_3$); triorgano mono-, di-, and trithiophosphates (O=P(OR)$_2$(SR), O=P(OR)(SR)$_2$, and O=P(SR)$_3$); triorgano thionophosphates (S=P(OR)$_3$); triorgano mono-, di-, and trithiothionophosphates (S=P(OR)$_2$(SR), S=P(OR)(SR)$_2$, and S=P(SR)$_3$); diorgano organophosphonates (O=P(OR)$_2$R); diorgano mono- and dithiorganophosphonates (O=P(OR)(SR)R and O=P(SR)$_2$R); diorgano organothionophosphonates (S=P(OR)$_2$R); and diorgano mono- and dithioorganothionophosphonates (S=P(OR)(SR)R and S=P(SR)$_2$R). Mixtures of phosphorus acid esters also can be employed.

Specific examples of diorgano phosphites include dimethyl phosphite, diethyl phosphite, di-2-aminoethyl phosphite, dihexyl phosphite, hexyl decyl phosphite, didecyl phosphite, didodecyl phosphite, diphenyl phosphite, dichlorophenyl phosphite, dinaphthyl phosphite, ethyl phenyl phosphite, ditolyl phosphite, dimethylphenyl phosphite, dihexylphenyl phosphite, and diphenylhexyl phosphite.

Specific examples of diorgano mono- and dithiophosphites include dimethyl thiophosphite and dithiophosphite, diethyl thiophosphite and dithiophosphite, ethyl butyl thiophosphite and dithiophosphite, dihexyl thiophosphite and dithiophosphite, didodecyl thiophosphite and dithiophosphite, diphenyl thiophosphite and dithiophosphite, phenyl hexyl thiophosphite and dithiophosphite, diphenylhexyl thiophosphite and dithiophosphite, and dioctylphenyl thiophosphite and dithiophosphite.

Specific examples of diorgano thionophosphites include dimethyl thionophosphite, diethyl thionophosphite, dioctyl thionophosphite, octyl decyl thionophosphite, didodecyl thionophosphite, ethyl phenyl thionophosphite, diphenyl thionophosphite, ditolyl thionophosphite, and dihexylphenyl thionophosphite.

Specific examples of diorgano mono- and dithithionophosphites include dimethyl thiothionophosphite and dithiothionophosphite, diethyl thiothionophosphite and dithiothionophosphite, dibutyl thiothionophosphite and dithiothionophosphite, butyl hexyl thiothionophosphite and dithiothionophosphite, diethylhexyl thiothionophosphite and dithiothionophosphite, didecyl thiothionophosphite and dithiothionophosphite, didodecyl thiothionophosphite and dithiothionophosphite, diphenyl thiothionophosphite and dithiothionophosphite, diaminophenyl thiothionophosphite and dithiothionophospite, ethyl phenyl thiothionophosphite and dithiothionophosphite, diphenylethyl thiothionophosphite and dithiothionophosphite, diphenylhexyl thiothionophosphite and dithiothionophosphite, and dihexylphenyl thiothionophosphite and dithiothionophosphite.

Specific examples of di- and triorgano orthophosphates include di- and trimethyl orthophosphate, di- and triethyl orthophosphate, di- and tributyl orthophosphate, di- and trihexyl orthophosphate, di- and tridecyl orthophosphate, di- and tridodecyl orthophosphate, di- and triphenyl orthophosphate, ethyl phenyl orthophosphate, ethyl diphenyl orthophosphate, di- and trichlorophenyl orthophosphate, di- and tri- phenylbutyl orthophosphate, di- and trihexylphenyl orthophosphate, di- and triphenylethyl orthophosphate, and di- and triphenylhexyl orthophosphate.

Specific examples of di- and triorgano mono-, di-, and trithiophosphates include O,O-dimethyl thiophosphate (O=P(OCH$_3$)$_2$(SH)), O,S-dimethyl thiophosphate (O=P(OCH$_3$)(SCH$_3$)(OH)), O,S-dimethyl dithiophosphate (O=P(OCH$_3$)(SCH$_3$)(SH)), S,S-dimethyl dithiophosphate (O=P(SCH$_3$)$_2$(OH)), dimethyl trithiophosphate (O=P(SCH$_3$)$_2$(SH)), trimethyl thiophosphate, dithiophosphate, and trithiophosphate, O,O-diethyl thiophosphate, O,S-diethyl dithiophosphate, diethyl trithiophosphate, triethyl thiophosphate, dithiophosphate, and trithiophosphate, O-ethyl S-pentyl thiophosphate, O-ethyl S-pentyl dithiophosphate, ethyl pentyl trithiophosphate, O,O-diethyl S-pentyl thiophosphate, O,S-diethy O-pentyl thiophosphate, O,S-diethyl S-pentyl dithiophosphate, S,S-diethyl O-pentyl dithiophosphate, diethyl pentyl trithiophosphate, O,S-dichloroethylhexyl thiophosphate, S,S-dichloroethylhexyl dithiophosphate, trichloroethylhexyl thiophosphate, dithiophosphate, and trithiophosphate, O,S-didodecyl thiophosphate, O,S-didodecyl dithiophosphate, didodecyl trithiophosphate, tridodecyl thiophosphate, dithiophosphate, and trithiophosphate, O,O-diphenyl thiophosphate, O,S-diphenyl thiophosphate, O,S-diphenyl dithiophosphate, S,S-diphenyl dithiophosphate, diphenyl trithiophosphate, triphenyl thiophosphate, dithiophosphate, and trithiophosphate, O,S-diphenylbutyl thiophosphate, S,S-diphenylbutyl dithiophosphate, triphenylbutyl thiophosphate, dithiophosphate, and trithiophosphate, O,O-dihexylphenyl thiophosphate, O,S-dihexylphenyl dithiophosphate, dihexylphenyl trithiophosphate, and trihexylphenyl thiophosphate, dithiophosphate, and trithiophosphate.

Specific examples of di- and triorgano thionophosphates include di- and trimethyl thionophosphate, di- and triethyl thionophosphate, di- and tributyl thionophosphate, di- and trihexyl thionophosphate, di- and tridodecyl thionophosphate, di- and triphenyl thionophosphate, ethyl phenyl thionophosphate, ethyl diphenyl thionophosphate, di- and trichlorophenyl thionophosphate, di- and triphenylbutyl thionophosphate, di- and trihexylphenyl thionophosphate, di- and triphenylethyl thionophosphate, and di- and triphenylhexyl thionophosphate.

Specific examples of di- and triorgano mono-, di-, and trithiothionophosphates include O,O-dimethyl thiothionophosphate, O,S-dimethyl thiothionophosphate, O,S-dimethyl dithiothionophosphate, S,S-dimethyl dithiothonophosphate, dimethyl trithiothionophosphate, trimethyl thiothionophosphate, dithiothionophosphate, and trithiothionophosphate, O,O-diethyl thiothionophosphate, O,S-diethyl dithiothionophosphate, diethyl trithiothionophosphate, triethyl thiothionophosphate, dithiothionophosphate, and trithiothionophosphate, O-ethyl S-pentyl thiothionophosphate, O-ethyl S-pentyl dithiothionophosphate, O,O-diethyl S-pentyl thiothionophosphate, O,S-diethyl O-pentyl thiothionophosphate, O,S-diethyl S-pentyl dithiothionophosphate, S,S-diethyl O-pentyl dithiothionophosphate, diethyl pentyl trithiothionophosphate, O,O-dichloroethylhexyl thiothionophosphate, S,S-dichloroethylhexyl dithiothionophosphate, dichloroethylhexyl trithiothionophosphate, trichloroethylhexyl thiothionophosphate, dithiothionophosphate, and trithiothionophosphate, O,S-didodecyl thiothionophosphate, O,S-didodecyl dithiothionophosphate, tridodecyl thiothionophosphate, dithiothionophosphate, and trithiothionophosphate, O,O-diphenyl thiothionophosphate, O,S-diphenyl thiothionophosphate, O,S-diphenyl dithiothionophosphate, S,S-diphenyl dithiothionophosphate, diphenyl trithiothionophosphate, triphenyl thiothionophosphate, dithiothionophosphate, and trithiothionophosphate, O,O-diphenylbutyl thiothionophosphate, O,S-diphenylbutyl dithiothionophosphate, triphenylbutyl thiothionophosphate, dithiothionophosphate, and trithiothionophosphate, O,S-dihexylphenyl thiothionophosphate, S,S-dihexylphenyl dithiothionophosphate, dihexylphenyl trithiothionophosphate, and trihexylphenyl thiothionophosphate, dithiothionophosphate, and trithiothionophosphate.

Specific examples of diorgano organophosphonates include dimethyl methylphosphonate, dimethyl ethylphosphonate, diethyl methylphosphonate, diethyl ethylphosphonate, dichloroethyl chloroethylphosphonate, dibutyl butylphosphonate, dihexyl ethylphosphonate, dihexyl hexylphosphonate, dinonyl nonylphosphonate, didodecyl dodecylphosphonate, diethyl phenylphosphonate, ethyl hexyl phenylphosphonate, diphenyl ethylphosphonate, ethyl phenyl phenylphosphonate, diphenyl phenylphosphonate, diethylphenyl phenylphosphonate, dibutylphenyl butylphenylphosphonate, dihexylphenyl hexylphenylphosphonate, diphenylethyl phenylethylphosphonate, diphenylhexyl phenylphosphonate, and hexyl phenylhexyl phenylhexylphosphonate.

Specific examples of diorgano mono- and dithioorganophosphonates include dimethyl thiomethylphosphonate and dithiomethylphosphonate, dimethyl thioethylphosphonate and dithioethylphosphonate, diethyl thiomethylphosphonate and dithiomethylphosphonate, diethyl thioethylphosphonate and dithioethylphosphonate, dichloroethyl thiochloroethylphosphonate and dithiochloroethylphosphonate, dibutyl thiobutylphosphonate and dithiobutylphosphonate, dihexyl thiohexylphosphonate and dithiohexylphosphonate, didodecyl thiododecylphosphonate and dithiododecylphosphonate, diethyl thiophenylphosphonate and dithiophenylphosphonate, ethyl hexyl thiophenylphosphonate and dithiophenylphosphonate, diphenyl thioethylphosphonate and dithioethylphosphonate, ethyl phenyl thiophenylphosphonate and dithiophenylphosphonate, diphenyl thiophenylphosphonate and dithiophenylphosphonate, diethylphenyl thiophenylphosphonate and dithiophenylphosphonate, dihexylphenyl thiohexylphenylphosphonate and dithiohexylphenylphosphonate, diphenylethyl thiophenylethylphosphonate and dithiophenylethylphosphonate, and hexyl hexylphenyl thiophenylphosphonate and dithiophenylphosphonate.

Specific examples of diorgano organothionophosphonates include dimethyl methylthionophosphonate, dimethyl ethylthionophosphonate, diethyl methylthionophosphonate, diethyl ethylthionophosphonate, dichloroethyl chloroethylthionophosphonate, dibutyl butylthionophosphonate, dihexyl ethylthionophosphonate, dihexyl hexylthionophosphonate, dinonyl nonylthionophosphonate, didodecyl dodecylthionophosphonate, diethyl phenylthionophosphonate, ethyl hexyl phenylthionophosphonate, diphenyl ethylthionophosphonate, ethyl phenyl phenylthionophosphonate, diphenyl phenylthionophosphonate, diethylphenyl phenylthionophosphonate, dibutylphenyl butylphenylthionophosphonate, dihexylphenyl hexylphenylthionophosphonate, diphenylethyl phenylethylthionophosphonate, diphenylhexyl phenylthionophosphonate, and hexyl phenylhexyl phenylhexylthionophsophonate.

Specific examples of diorgano mono- and dithioorganothionophosphonates include dimethyl thiomethylthionophosphonate and dithiomethylthionophosphonate, dimethyl thioethylthionophosphonate and dithioethylthionophosphonate, diethyl thiomethylthionophosphonate and dithiomethylthionophosphonate, diethyl thioethylthionophosphonate and dithioethylthionophosphonate, dichloroethyl thiochloroethylthionophosphonate, and dithiochloroethylthionophosphonate, dibutyl thiobutylthionophosphonate and dithiobutylthionophosphonate, dihexyl thiohexylthionophosphonate and dithiohexylthionophosphonate, didodecyl thiododecylthionophosphonate and dithiododecylthionophosphonate, diethyl thiophenylthionophosphonate and dithiophenylthionophosphonate, ethyl hexyl thiophenylthionophosphonate and dithiophenylthionophosphonate, diphenyl thioethylthionophosphonate and dithioethylthionophosphonate, ethyl phenyl thiophenylthionophosphonate and dithiophenylthionophosphonate, diphenyl thiophenylthionophosphonate and dithiophenylthionophosphonate, diethylphenyl thiophenylthionophosphonate and dithiophenylthionophosphonate, dihexylphenyl thiohexylphenylthionophosphonate and dithiohexylphenylthionophosphonate, diphenylethyl thiophenylethylthionophosphonate and dithiophenylethylthionophosphonate, and hexyl hexylphenyl thiophenylthionophosphonate and dithiophenylthionophosphonate.

The particular phosphorus acid ester to be employed according to this invention will vary depending on the desired final product. However, as in the case of the metal acid salts, it is preferred to employ phosphorus acid esters which lead to formation of low boiling organic acid ester by-products. Accordingly, phosphorus acid esters which are preferred as starting materials are those wherein each R in the formula Y=P(YR)$_2$A is an alkyl radical of 1 to about 6 carbon atoms. Such compounds include the diorgano phosphites, orthophosphates, and organophosphonates, mono- and dithiophosphites, mono-, di-, and trithiophosphates, and mono-, and dithioorganophosphonates, thionophosphites, thionophosphates, and organothionophosphonates, mono-, and dithiothionophosphites, mono-, di-, and trithiothionophosphates, and mono- and dithioorganothionophosphonates; and the triorgano orthophosphates, mono-, di-, and trithiophosphates, thionophosphates, and mono-, di-, snd trithiothionophosphates wherein the organic radicals are alkyl radicals of 1 to about 6 carbon atoms such as methyl, ethyl, propyl, butyl, pentyl, and hexyl. Among such materials, those wherein each Y in the formula Y=P(YR)$_2$A is oxygen, such as the dialkyl phosphites, di- and trialkyl orthophosphates, and dialkyl alkylphosphonates are more preferred due to the toxicity of the thio-, thiono- and thiothionoesters. Most preferably, a dialkyl phosphite or trialkyl orthophosphate having 1 to about 6 carbon atoms per alkyl radical is employed. According to the method of this invention, at least one metal salt of an organic acid and at least one phosphorus acid ester are reacted in amounts such that phosphorus acid ester salts having at least one phosphorus acid ester group bonded to metal through oxygen or sulfur are produced, and at a temperature such that the reaction will proceed without substantial decomposition of the phosphorus acid ester.

The amount of starting materials sufficient to give a phosphorus acid ester salt having at least one phosphorus acid ester group bonded to metal through oxygen preferably is such that the equivalent ratio of phosphorus acid ester to metal-carboxylate bonds in the metal acid salt ranges from about 0.3:1 to about 10:1. At equivalent ratios below about 1:1, mixed organic acid-phosphorus acid ester salts and/or mixtures of organic acid salts and phosphorus acid ester salts are produced. While these mixed salts and mixtures of salts are useful in certain applications, such products are not preferred herein. Accordingly, equivalent ratios of phosphorus acid ester to metal-carboxylate bonds which are more preferred range from about 1:1 to about 10:1. Advantageously, an excess of the phosphorus acid ester is employed because reaction rates are thereby increased. However, the excess should not be so great as to cause difficulties in removing unreacted phosphorus acid ester. Accordingly, equivalent ratios of phosphorus acid ester to metal-carboxylate bonds ranging from about 1.1:1 to about 6:1 are particularly preferred with about 1.1:1 to about 3:1 being most preferred.

The preparative reaction is carried out at any convenient temperature at which the starting materials will react but not so high as to lead to decomposition of the phosphorus acid ester employed. Preferred reaction temperatures range from about 0° to about 150° C. with temperatures in the upper portion of the range being more preferred in order to increase reaction rates. When the starting materials are selected such that low boiling (i.e. below about 150° C.) organic acid ester reaction by-products are formed, it is most preferred to carry out the preparation at a temperature ranging from the organic acid ester boiling point to about 150° C. In this manner, reaction by-products can be substantially removed during the preparation, and as a result, production rates are increased. In such cases, completion of the reaction is indicated by the cessation of by-product evolution. In general, reaction times range from several minutes to several hours, and preferably, from about 1 to about 20 hours. More preferably, the reaction is carried out over a period of about 1 to about 10 hours.

The preparative reaction can be carried out neat or in the presence of a diluent which is liquid at reaction temperatures and substantially inert to the starting materials. Useful diluents include alkanes, such as hexane, heptane, octane, nonane, decane; cycloalkanes, such as cyclohexane; aromatics, such as benzene and ethylbenzene; and hydrogenated and halogenated aromatics such as tetrahydronaphthalene, decahydronaphthalene, and o-dichlorobenzene.

The preparative reaction according to this invention preferably is carried out under substantially anhydrous conditions to avoid contamination of products. This is particularly important when salts of easily oxidized metal, such as iron(II) and vanadium(III) are used as starting materials. Conveniently, anhydrous conditions are maintained by carrying out the preparation under an atmosphere of an inert gas such as nitrogen. Drying of the metal acid salts to be employed in the preparation is desirable in this regard as is purification of any diluent to be employed, such as by percolation through molecular sieves and/or silica gel.

As a result of the above-described preparation, there are obtained metal salts of phosphorus acid esters and by-product organic acid esters. As noted above, when the starting materials have been selected such that low boiling organic acid ester by-products are formed, the same are conveniently removed during the preparation through the use of suitable temperatures. By-product removal also can be achieved by decantation, filtration, and through the use of reduced pressures. After removal of reaction by-products, the remaining salt preferably is washed with an inert hydrocarbon such as hexane or another alkane to remove incompletely reacted starting materials.

According to a preferred embodiment of this invention, the above-described method is employed in the preparation of divalent metal salts of phosphorus acid esters having at least one phosphorus acid ester group bonded to metal through oxygen or sulfur which are useful in the preparation of catalyst components for the polymerization of alpha-olefins, and particularly, as support materials in the preparation of highly active alpha-olefin polymerization catalyst components as disclosed in our copending patent application. The phosphorus acid ester salts which are prepared according to this embodiment of the invention are salts of divalent Group IIA, IIB, IVA, VIIB, or VIII metals such as magnesium, calcium, zinc, cadmium, tin, manganese, iron, and cobalt. Preferably, the salts prepared according to this embodiment of the invention are those wherein two phosphorus acid ester groups are bonded to the metal through oxygen or sulfur. More preferably, such phosphorus acid ester salts are those wherein the organic radicals in the phosphorus acid ester groups bonded to metal through oxygen or sulfur are alkyl radicals of 1 to about 6 carbon atoms and the metal is magnesium, manganese, or iron. Among such salts, the alkyl phosphite, orthophosphate, dialkyl orthophosphate, and alkyl alkylphosphonate salts are particularly preferred, with the dialkyl orthophosphate salts of magnesium being most preferred.

The metal acid salts and phosphorus acid esters employed as starting materials according to this embodiment of the invention are selected on the basis of the phosphorus acid ester salt desired. Suitable metal acid salts include the divalent Group IIA, IIB, IVA, VIIB, and VIII metal salts of aliphatic acids having 2 to about 20 carbon atoms, aromatic acids having 7 to about 12 carbon atoms, and aliphatically-substituted aromatic acids and aryl-substituted aliphatic acids having 8 to about 20 carbon atoms. Specific examples of such organic acid groups and various divalent metal salts thereof are set forth above. Salts of monocarboxylic acids are preferred. Useful phosphorus acid esters and specific examples thereof also are as described above.

The method according to this embodiment of the invention is substantially as described above. When the phosphorus acid ester salt to be prepared is to be employed as a support material in the preparation of highly active alpha-olefin polymerization catalyst components it is particularly important to exclude materials such as water, oxygen, and carbon dioxide from the phosphorus acid ester salt because these materials act as catalyst poisons. To this end, the metal acid salts employed in preparation of the phosphorus acid ester salts are dried prior to use and the preparation is carried out under substantially anhydrous conditions. Organic acid ester reaction by-products also act as catalyst poisons and should be substantially removed prior to use of the phosphorus acid ester salts as support materials. To this end, it is preferred that the divalent metal acid salts employed as starting materials be salts of alkanoic acids of 2 to about 6 carbon atoms and that the phosphorus acid ester starting materials be those wherein each R in the formula Y=P(YR)$_2$A is an alkyl radical of 1 to about 6 carbon atom acids because the use of such materials results in formation of organic acid ester by-products which can be substantially and conveniently removed from the final product or the preparative system through simple distillation.

Specific examples of preferred divalent Group IIA, IIB, IVA, VIIB, and VIII salts of alkanoic acids of 2 to about 6 carbon atoms include the acetates, propionates, butyrates, valerates, and caproates of magnesium, calcium zinc, cadmium, tin, manganese, iron, and cobalt. The acetates are most preferred.

Specific examples of preferred phosphorus acid esters wherein R in the formula Y=P(YR)$_2$A is an alkyl radical of 1 to about 6 carbon atoms are the dimethyl, diethyl, dipropyl, dibutyl, dipentyl, and dihexyl phosphites, mono- and dithiophosphites, thionophosphites, mono- and dithiothionophosphites, orthophosphates, mono-, di-, and trithiophosphates, thionophosphates, mono-, di-, and trithiothionophosphates, the trimethyl, triethyl, tripropyl, tributyl, tripentyl, and trihexyl orthophosphates, mono-, di-, and trithiophosphates, thionophosphates, and mono-, di-, and trithiothionophosphates, and the dimethyl, diethyl, dipropyl, dibutyl, dipentyl, and dihexyl alkylphosphonates, mono- and dithioalkylphosphonates, alkylthionophosphonates, and mono- and dithioalkylthionophosphonates wherein the alkyl radicals are methyl, ethyl, propyl, butyl, pentyl, or hexyl. As noted above, the phosphite, orthophosphate, and alkylphosphonate salts are preferred over the sulfur-containing phosphorus acid ester salts, and accordingly, phosphorus acid esters, wherein each Y in the formula Y=P(YR)$_2$A is oxygen are preferred over the thio-, thiono-, and thiothionoesters.

The starting materials employed according to this embodiment of the invention are reacted in amounts such that phosphorus acid ester salts having at least one phosphorus acid ester group bonded to metal through oxygen are produced, and preferably, in amounts such that the equivalent ratio of phosphorus acid ester to metal-carboxylate bonds in the metal acid salt ranges from about 0.5:1 to about 10:1. Phosphorus acid ester salts having two phosphorus acid ester groups bonded to metal through oxygen or sulfur are preferred products according to this embodiment of the invention, and accordingly, more preferred equivalent ratios of phosphorous acid ester to metal-carboxylate bonds ranges from 1:1 to about 10:1. More preferably an excess of the phosphorus acid ester is employed in order to increase reaction rates, however, phosphorus acid esters can act to poison alpha-olefin polymerization catalysts, and therefore, the excess should not be so great as to hinder removal of incompletely reacted phosphorus acid ester from the final product. To these ends, the equivalent ratio of phosphorus acid ester to metalcarboxylate bonds desirably ranges from about 1.1:1 to about 6:1, and most preferably, from about 1.1:1 to about 3:1.

In other respects, the preparation according to this aspect of the invention is as described above. Preferred reaction temperatures range from about 0° to about 150° C. When the starting metal acid salt and phosphorus acid ester are selected such that low boiling (i.e., below about 150° C.) organic acid ester by-products are formed, it is more preferred to carry out the preparation at temperatures sufficiently high to distill the by-product ester but below about 150° C. When divalent metal acetates and phosphorus acid esters wherein each R in the formula Y=P(YR)$_2$A is an ethyl radical and each Y is oxygen are used as starting materials, reaction temperatures most preferably range from about 70° to about 150° C.

After the preparation and removal of organic acid ester by-products, the phosphorus acid ester salt preferably is washed with an inert hydrocarbon such as hexane or another alkane to remove incompletely reacted phosphorus acid ester which, as noted above, can act as a poison to alpha-olefin polymerization catalysts.

The following examples illustrate the present invention and are not intended to limit the scope thereof.

EXAMPLE I

Magnesium bis(diethyl orthophosphate) was prepared according to the following procedure:

(A) Drying of magnesium acetate.

Into a 300 ml. flask equipped with mechanical stirrer and a condenser, and maintained under a nitrogen atmosphere, were added 21.5 grams magnesium acetate tetrahydrate and 100 ml. acetic anhydride and the mixture was heated at the reflux temperature for 3 hours. After the mixture had cooled, the liquid was drawn off and the solid dried at 40° C. under a vacuum of 0.2 mm mercury for several hours to obtain anhydrous magnesium acetate.

(B) Preparation of the bis(diethyl orthophosphate) salt.

85 ml. nonane and 35 ml. triethyl orthophosphate were added to the solid, anhydrous magnesium acetate in a flask equipped as in (A) and the mixture was heated to the reflux temperature. When the temperature had reached 70° C. ethyl acetate began to distill and a total of 17 ml. were recovered. Following heating, the contents of the flask were cooled and then filtered under a nitrogen atmosphere. The solid product then was washed with 200 ml. dry hexane and dried at 50° C. under a vacuum of 0.3 mm mercury for several hours. As a result, 24 grams of needle-like, white, solid magnesium bis(diethyl orthophosphate) were obtained.

EXAMPLE II

Magnesium bis(diethyl orthophosphate) was prepared according to the following procedure:

(A) Drying of magnesium acetate.

Into a 300 ml. flask equipped as in EXAMPLE I and maintained under a nitrogen atmosphere were added 21.5 grams magnesium acetate tetrahydrate and 80 ml. acetic anhydride and the mixture was heated at the reflux temperature for 1 hour. After cooling, a clear liquid was drawn off and the remaining solid was dried at 35° C. under a vacuum of 0.3 mm mercury for several hours to obtain anhydrous magnesium acetate.

(B) Preparation of the bis(diethyl orthophosphate) salt.

50 ml. triethyl orthophosphate were added to the solid, anhydrous magnesium acetate in a flask equipped as in (A) and the mixture was heated to distill 17 ml. ethyl acetate. The viscous liquid remaining in the flask was cooled resulting in the formation of a gel. 100 ml. hexane were added and the gel broken up to form a finely divided solid. The solid was filtered, washed three times with 50 ml. portions of dry hexane, and then dried in a vacuum oven at 50° C. to give 31.2 g. dried, solid magnesium bis(diethyl orthophosphate).

EXAMPLE III

Into a flask equipped as in EXAMPLE I and under nitrogen were added 8.9 g. anhydrous magnesium acetate, 33.7 g. diethyl phosphite, and 100 ml. nonane. A reaction took place as evidenced by the formation of a glassy solid on the bottom of the flask. However, two liquid phases were present and mixing was unsatisfactory due to the positioning of the stirrer, so the preparation was discontinued.

EXAMPLE IV

Into a flask equipped as in EXAMPLE I were added 13.7 g. anhydrous magnesium acetate and 60 ml. diethyl phosphite and the mixture was heated at the reflux temperature for about ½ hour. 15 ml. ethyl acetate distilled during this time. The liquid remaining in the flask was cooled to about 70° C. and, on dilution with 100 ml. hexane, a solid formed. The solid was filtered, washed with hexane, and then dried in a vacuum oven. 29.5 g. of a solid, containing magnesium bis(ethyl phosphite) and a minor amount of diethyl phosphite due to incomplete washing and drying were obtained.

EXAMPLE V

Into a 300 ml flask equipped as in EXAMPLE I and under nitrogen were placed 13.5 g. anhydrous magnesium acetate and 60 ml. triethyl phosphite. The mixture was heated and 15 ml. of a liquid having an odor similar to that of triethyl phosphite were distilled in the 25°-120° C. temperature range. The mixture was cooled and the solid separated by filtration. The solid was washed with hexane and dried under vacuum at 40° C. The dried solid weighed 13.7 g. and was unchanged in appearance from the starting magnesium acetate. Apparently, no reaction took place.

This example illustrates a preparation in which the phosphorus acid ester employed as a starting material did not contain oxygen or sulfur double bonded to phosphorus. As can be seen, the preparation was unsuccessful.

EXAMPLE VI

Manganous bis(diethyl orthophosphate) was prepared according to the following procedure:

(A) Drying of manganous acetate.

Into a 500 ml. flask equipped as in EXAMPLE I and under nitrogen were added 30.4 g. manganous acetate tetrahydrate and 150 ml. acetic anhydride. The mixture was heated at the reflux temperature for one hour and then stirred for 3½ days. The liquid contained in the flask then was decanted and the remaining solid was washed with hexane, collected on a filter, and dried in a vacuum oven at 97° C. for several hours to give 20.6 g. of solid, slightly pink, anhydrous manganous acetate.

(B) Preparation of the bis(diethyl orthophosphate) salt.

The solid obtained in (A) was placed in a 500 ml. flask equipped as in EXAMPLE I and under nitrogen and 100 ml. triethyl orthophosphate and 100 ml. nonane were added thereto. The mixture then was heated and 24 ml. ethyl acetate distilled at about 75° C. As the temperature was increased to 110° C. the solid completely dissolved but no more ethyl acetate was recovered. Heating a 110° C. was continued for about an hour and then the solution was allowed to cool resulting in formation of a slightly yellow precipitate. After the mixture had been cooled to 0° C., the solid was collected on a filter, washed with cold hexane, and dried in a vacuum oven at 97° C. for several hours. 37.1 g. of solid manganous bis(diethyl orthophosphate) were recovered.

EXAMPLE VII

Ferrous bis(diethyl orthophosphate) was prepared as follows:

(A) Preparation of ferrous acetate.

Into a 300 ml. flask equipped as in EXAMPLE I and under nitrogen were added 5.6 g. iron filings and 100 ml. acetic acid. The contents of the flask then were heated at the reflux temperature for 3 hours and a white solid formed. Excess iron was removed with a magnet and the mixture was centrifuged. The liquid was decanted and the remaining solid washed with 400 ml. hexane to give 16.3 g. white, solid ferrous acetate.

(B) Preparation of the bis(diethyl orthophosphate) salt.

Seven grams of the ferrous acetate prepared in (A) were combined with 80 ml. nonane and 40 ml. triethyl orthophosphate in a 300 ml. flask equipped as in EXAMPLE I and under nitrogen. The mixture was heated at the reflux temperature for 2 hours during which 8 ml. ethyl acetate distilled. The contents of the flask then were cooled and filtered, and the solid washed with 400 ml. hexane. The solid then was dried in a vacuum oven at 50° C. to give 13 g. ferrous bis(diethyl orthophosphate).

EXAMPLE VIII

Calcium bis(diethyl orthophosphate) was prepared as follows:

(A) Drying of calcium acetate.

Into a 500 ml. flask equipped as in EXAMPLE I and under nitrogen were added 47 g. hydrated calcium acetate and 200 ml. acetic anhydride. The mixture was stirred and heated at the reflux temperature for 1 hour. The resulting mixture then was filtered and the solid washed with hexane and dried in a vacuum oven at 76° C. for several hours to give 48.0 g. dried, solid calcium acetate.

(B) Preparation of the bis(diethyl orthophosphate) salt.

Into a 500 ml. flask equipped as in EXAMPLE I and under nitrogen were added 19.65 g. of the dried calcium acetate from (A), 150 ml. triethyl orthophosphate, and 100 ml. nonane. This mixture was heated to 140° C. to distill 75 ml. ethyl acetate. The resulting mixture was allowed to cool and then filtered and the solid product was washed with hexane. The solid then was dried at 135° C. in a vacuum oven and 37.3 g. solid calcium bis(diethyl orthophosphate) were obtained.

EXAMPLE IX

Into a 500 ml. flask equipped as in EXAMPLE I and under nitrogen were added 31.8 g. anhydrous nickel formate, 200 ml. triethyl orthophosphate, and 100 ml. nonane. This mixture was heated to 130° C. over a period of about 4 hours. No distillate was observed although it may have been lost unnoticed due to loosening of the equipment. The mixture was allowed to cool and the solid was collected, washed with hexane, and dried in a vacuum oven for several hours. There were obtained 30.0 g. of dried solid which was unchanged in appearance from the starting material, nickel formate. Apparently, no reaction had taken place. This example illustrates a preparation wherein the metal acid salt used as a starting material was a salt of an aliphatic acid having only 1 carbon atom. As can be seen, the preparation was unsuccessful.

We claim:

1. A process for the preparation of metal salts of phosphorus acid esters useful in the preparation of alpha-olefin polymerization catalyst components comprising reacting, under substantially anhydrous conditions, (1) at least one anhydrous divalent magnesium, calcium, manganese or iron salt of a monocarboxylic acid selected from the group consisting of aliphatic acids of 2 to about 20 carbon atoms, aromatic acids of 7 to about 12 carbon atoms, and aliphatically-substituted aromatic acids and aryl-substituted aliphatic acids of 8 to about 20 carbon atoms; and (2) at least one trialkyl orthophosphate having 1 to about 6 carbon atoms per alkyl radical in amounts such that a phosphorus acid ester salt having at least one phosphorus acid ester group bonded to metal through oxygen is formed, and at a temperature such that the divalent metal salt of a monocarboxylic acid and the trialkyl orthophosphate will react without substantial decomposition of the trialkyl orthophosphate.

2. The process of claim 1 wherein the equivalent ratio of phosphorus acid ester to metal-carboxylate bonds in the anhydrous divalent metal salt of an organic acid ranges from about 0.5:1 to about 10:1.

3. The process of claim 2 wherein the anhydrous divalent metal salt of an organic acid is a salt of an alkanoic acid having 2 to about 6 carbon atoms.

4. The process of claim 3 wherein the equivalent ratio of phosphorus acid ester to metal-carboxylate bonds in the anhydrous divalent metal salt of an organic acid ranges from about 1.1:1 to about 6:1.

5. The process of claim 4 wherein the anhydrous divalent metal salt of an organic acid is magnesium acetate, manganous acetate, or ferrous acetate.

6. The process of claim 5 wherein the anhydrous divalent metal salt of an organic acid is magnesium acetate.

7. The process of claim 6 wherein the reaction temperature ranges from that which is sufficient to distill organic acid ester reaction by-products to about 150° C.

8. The process of claim 7 wherein the trialkyl orthophosphate is triethyl orthophosphate and the reaction temperature ranges from about 70° to about 150° C.

* * * * *

UNITED STATES PATENT OFFICE
CERTIFICATE OF CORRECTION

Patent No. 4,233,253      Dated November 11, 1980

Inventor(s)    GLEN R. HOFF AND PETER FOTIS

It is certified that error appears in the above-identified patent and that said Letters Patent are hereby corrected as shown below:

| Column | Line | |
|---|---|---|
| 1 | 65 | "alphaolefin" should read --alpha-olefin-- |
| 3 | 39 | "orgaic" should read --organic-- |
| 3 | 42 | "salt" should read --salts-- |
| 3 | 62 | "arachiodonate" should read --arachidonate-- |
| 6 | 10 | "and tri-phenylbutyl" should read --and triphenylbutyl-- |
| 8 | 68 | "According to the" should start new paragraph |
| 9 | 64 | "metal" should read --metals-- |
| 11 | 63 | "metalcarboxylate" should read --metal-carboxylate-- |
| 14 | 1 | "a" should read --at-- |

Signed and Sealed this

Fourth Day of May 1982

[SEAL]

Attest:

Attesting Officer

GERALD J. MOSSINGHOFF

Commissioner of Patents and Trademarks